(12) United States Patent
Bol

(10) Patent No.: US 7,748,422 B2
(45) Date of Patent: Jul. 6, 2010

(54) WHEEL MOUNTED PUMP FOR SELF-INFLATING TIRES

(76) Inventor: Stephen J. Bol, 3584 S. Sheridan Rd., Muskegon, MI (US) 49444

( * ) Notice: Subject to any disclaimer, the term of this patent is extended or adjusted under 35 U.S.C. 154(b) by 52 days.

(21) Appl. No.: 12/123,903

(22) Filed: May 20, 2008

(65) Prior Publication Data
US 2008/0289739 A1 Nov. 27, 2008

Related U.S. Application Data

(60) Provisional application No. 60/930,961, filed on May 21, 2007.

(51) Int. Cl.
*B60C 23/12* (2006.01)
(52) U.S. Cl. .................... 152/419; 152/426
(58) Field of Classification Search ............ 152/419, 152/423, 424, 425, 426
See application file for complete search history.

(56) References Cited

U.S. PATENT DOCUMENTS

| | | | |
|---|---|---|---|
| 677,710 A | 7/1901 | Stacy | |
| 1,029,340 A * | 6/1912 | Brest | 152/425 |
| 1,035,283 A * | 8/1912 | Wear | 152/425 |
| 1,132,167 A * | 3/1915 | Craw | 152/425 |
| 1,165,282 A * | 12/1915 | Pearson | 152/425 |
| 1,246,464 A * | 11/1917 | Randall | 152/426 |
| 1,793,429 A * | 2/1931 | Mascarenhas | 152/425 |
| 2,084,381 A * | 6/1937 | Demarest | 152/426 |
| 2,206,621 A * | 7/1940 | Smith | 152/426 |
| 2,214,597 A * | 9/1940 | Smith | 152/426 |
| 4,269,252 A * | 5/1981 | Shapiro | 152/426 |
| 4,349,064 A * | 9/1982 | Booth | 152/418 |
| 4,763,709 A | 8/1988 | Scholer | |
| 4,840,212 A | 6/1989 | Wei | |
| 5,201,968 A | 4/1993 | Renier | |
| 5,325,902 A | 7/1994 | Loewe et al. | |
| 5,349,064 A | 9/1994 | Akimoto et al. | |
| 5,355,924 A | 10/1994 | Olney | |
| 5,472,032 A | 12/1995 | Winston et al. | |
| 5,505,080 A | 4/1996 | McGhee | |
| 5,556,489 A | 9/1996 | Curlett et al. | |
| 5,558,730 A | 9/1996 | Olney et al. | |
| 5,591,281 A | 1/1997 | Loewe | |
| 5,616,196 A | 4/1997 | Loewe | |
| 5,846,354 A | 12/1998 | Winston et al. | |
| 5,865,917 A | 2/1999 | Loewe | |
| 5,975,174 A | 11/1999 | Loewe | |
| 6,533,010 B1 | 3/2003 | Alonso et al. | |
| 6,561,017 B1 | 5/2003 | Claussen et al. | |

(Continued)

FOREIGN PATENT DOCUMENTS

KR   1020040098830   11/2004

*Primary Examiner*—Russell D Stormer
(74) *Attorney, Agent, or Firm*—McGarry Bair PC

(57) ABSTRACT

An air pump, mounted on a wheel, which pumps ambient air into the tire chamber to automatically pump up the tire as the wheel rotates. The air pump generally comprises a cylinder and a piston, which relatively reciprocate to effect an intake stroke and a compression stroke. The intake stroke draws ambient air into a variable volume chamber. The pressurized air within the tire acts on the cylinder to effect the compression stroke, which forces the ambient air from the variable volume chamber into the tire chamber to pump up the tire.

20 Claims, 17 Drawing Sheets

U.S. PATENT DOCUMENTS

| | | |
|---|---|---|
| 6,691,754 B1 | 2/2004 | Moore |
| 6,772,812 B1 | 8/2004 | Hamilton |
| 6,865,930 B1 | 3/2005 | Claussen et al. |
| 6,943,673 B2 | 9/2005 | Skoff et al. |
| 7,117,910 B2 | 10/2006 | Akahori |
| 2005/0279439 A1 | 12/2005 | Wessman |

* cited by examiner

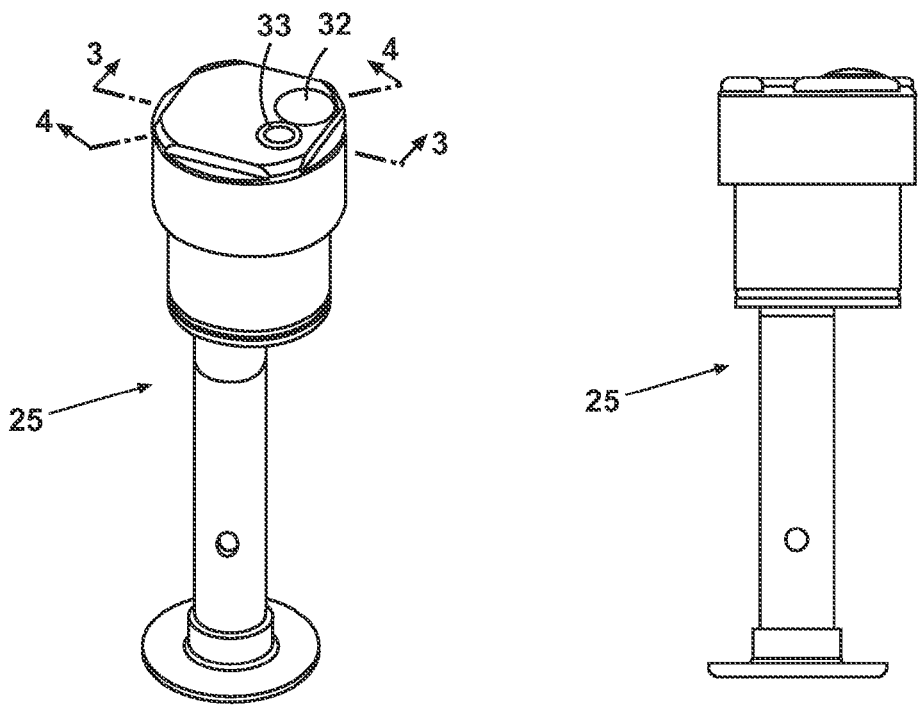
Fig. 1        Fig. 1A
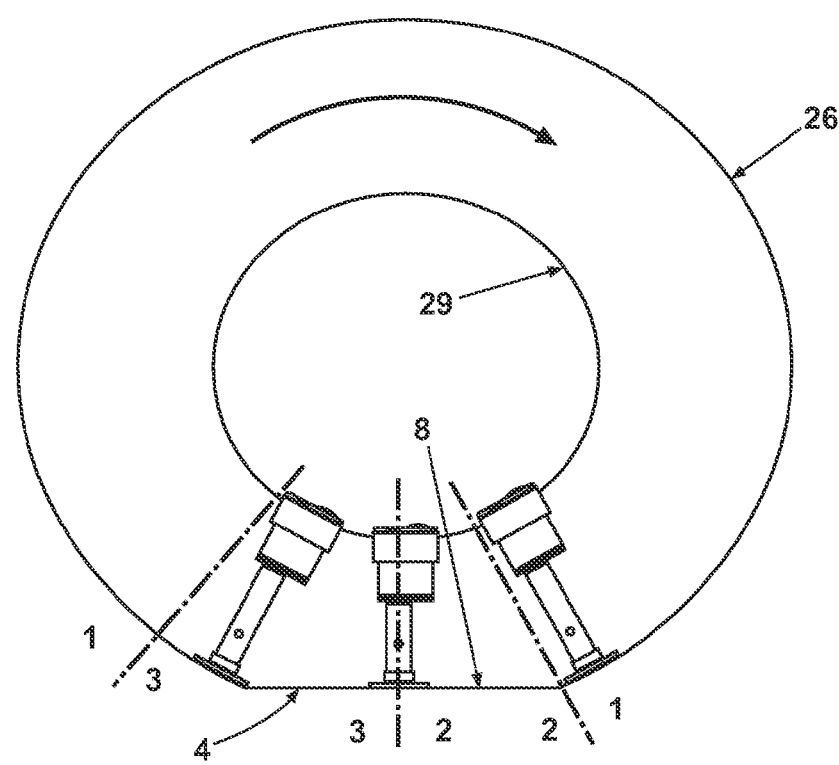
Fig. 2      Compression         Intake

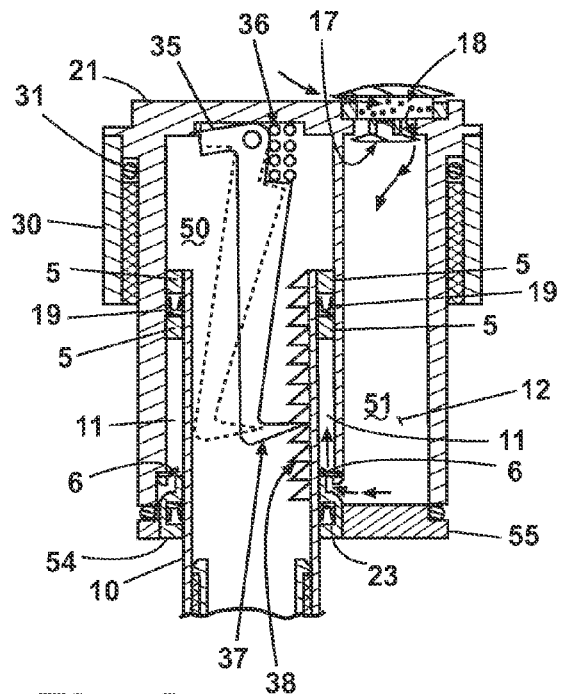
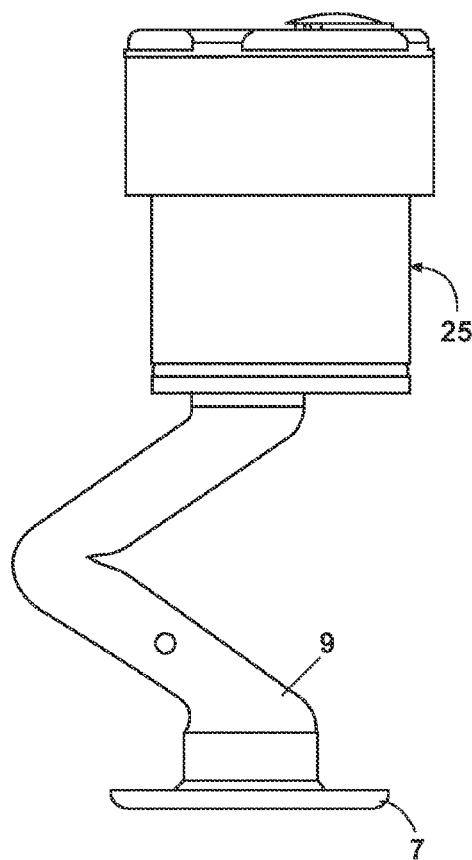
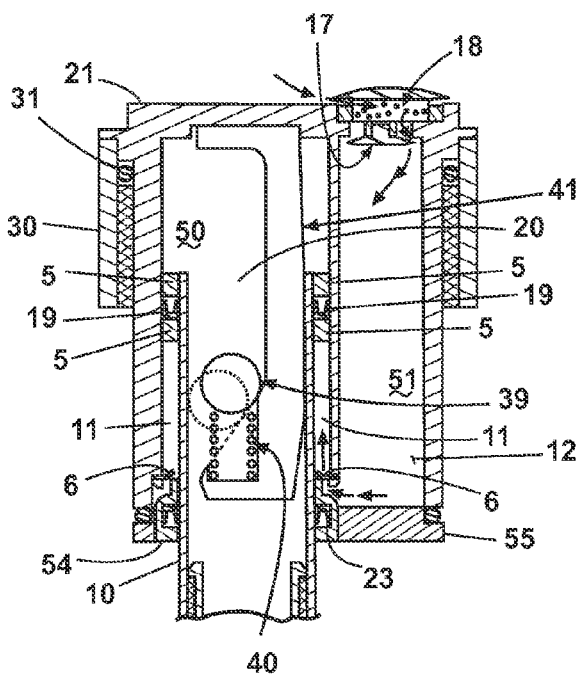
Fig. 8
Fig. 7
Fig. 9

WHEEL MOUNTED PUMP FOR SELF-INFLATING TIRES

CROSS-REFERENCE TO RELATED APPLICATION(S)

This application claims the benefit of U.S. Provisional Patent Application No. 60/930,961, filed May 21, 2007, whose disclosure is incorporated by reference.

BACKGROUND OF THE INVENTION

There are numerous sources of data that point out the fact that cars and trucks on the road have tire pressures that are significantly lower than recommended by the vehicle manufacturer. Having low tire pressure has many disadvantages. Tires with low pressure generate more heat and can fail, which is more probable and dangerous at high speed. In addition, low tire pressure is unsafe because it can adversely affect vehicle handling, including cornering and braking. Low tire pressure has also been shown to reduce tire life and fuel economy.

The importance of proper tire pressure has led to the commonplace use of tire pressure monitoring devices, which let the driver know when a tire has a pressure below a certain threshold. These systems are useful in that they identify the tire pressure problem, but they do not solve it. Time, effort and tire inflation equipment is required to add air to the tire. Other systems, used in military and commercial vehicles, maintain the proper tire pressure at all times, but are expensive and require special axle and/or hub components.

SUMMARY OF THE INVENTION

An air pump, mounted on a wheel, which pumps ambient air into the tire chamber to automatically pump up the tire as the wheel rotates. The air pump generally comprises a cylinder and a piston, which relatively reciprocate to effect an intake stroke and a compression stroke. The intake stroke draws ambient air into a variable volume chamber. The pressurized air within the tire acts on the cylinder to effect the compression stroke, which forces the ambient air from the variable volume chamber into the tire chamber to pump up the tire.

BRIEF DESCRIPTION OF THE DRAWINGS

In the drawings:

FIG. 1 is a perspective view of the pump according to a first embodiment of the invention.

FIG. 1A is a side view of the pump according to a first embodiment of the invention.

FIG. 2 illustrates the pump mounted to wheel showing zones of pump operation.

FIG. 7 illustrates an alternate embodiment of the pump of FIG. 1 with the addition of a buckling member shown in a buckled condition.

FIG. 8 illustrates an alternate embodiment of the pump of FIG. 1, with the addition of a ratchet type high-speed lock.

FIG. 9 illustrates an alternate embodiment of the pump of FIG. 1, with the addition of a friction-type high-speed lock.

DESCRIPTION OF AN EMBODIMENT OF THE INVENTION

Referring to FIGS. 1 and 1A, a first embodiment of a pump 25 according to the present invention is illustrated. The pump 25 automatically maintains a set tire pressure for a rotating tire 26 on a vehicle by simply driving the vehicle. The pump 25 can be a stand-alone system, meaning it does not need to interface with the vehicle (although electronics can be added to allow it to interface). An existing vehicle does not need modification to accept a wheel with this pump 25. This makes implementation of the pump 25 simple on existing or new vehicles.

Figure 3:
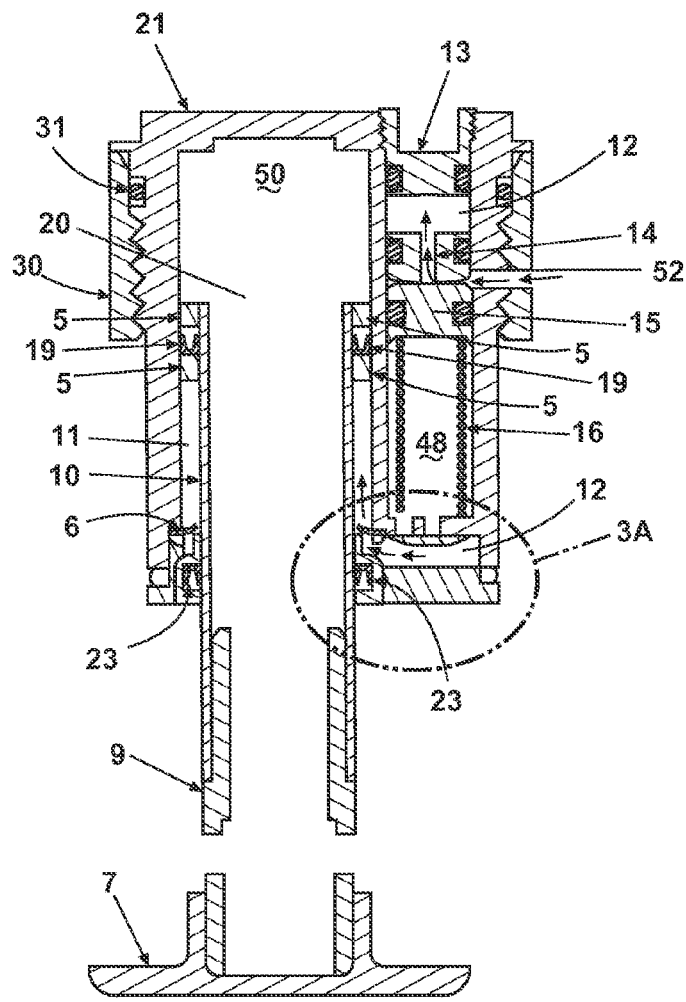
FIG. 3 is a cross-sectional view of the pump of FIG. 1 taken along line 3-3 of FIG. 1 through a relief valve assembly, with the pump being between a full intake and full compression position.

Referring to FIGS. 2 and 3, the pump 25 is affixed to a wheel 29 by way of threading a pump housing 21 into an adapter 30, which is brazed to the wheel 29, or the adapter 30 can be an integral part of the wheel 29. An O-ring 31 seals the threaded connection. Affixing the pump is not limited to the method described above because most bulkhead fitting styles can be utilized for affixing the pump 25 to the wheel 29. The pump 25 can be affixed by molding a rubber profile similar to a tubeless tire valve stem to the pump housing 21 and pulling it through a hole on the wheel 29

Figure 4:
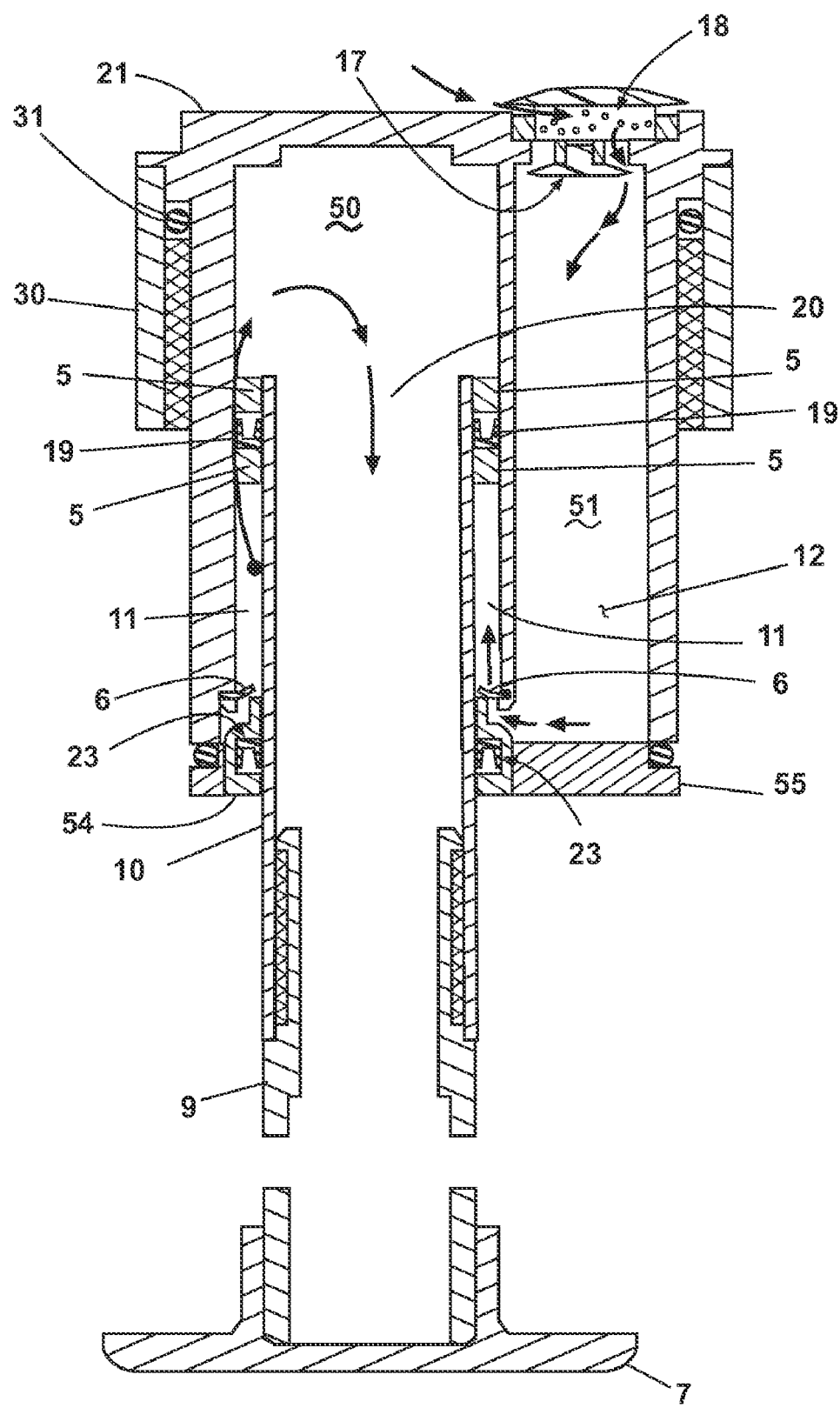
FIG. 4 is a cross-sectional view of the pump of FIG. 1 taken along line 4-4 of FIG. 1 through a fresh air intake assembly.
Figure 4A:
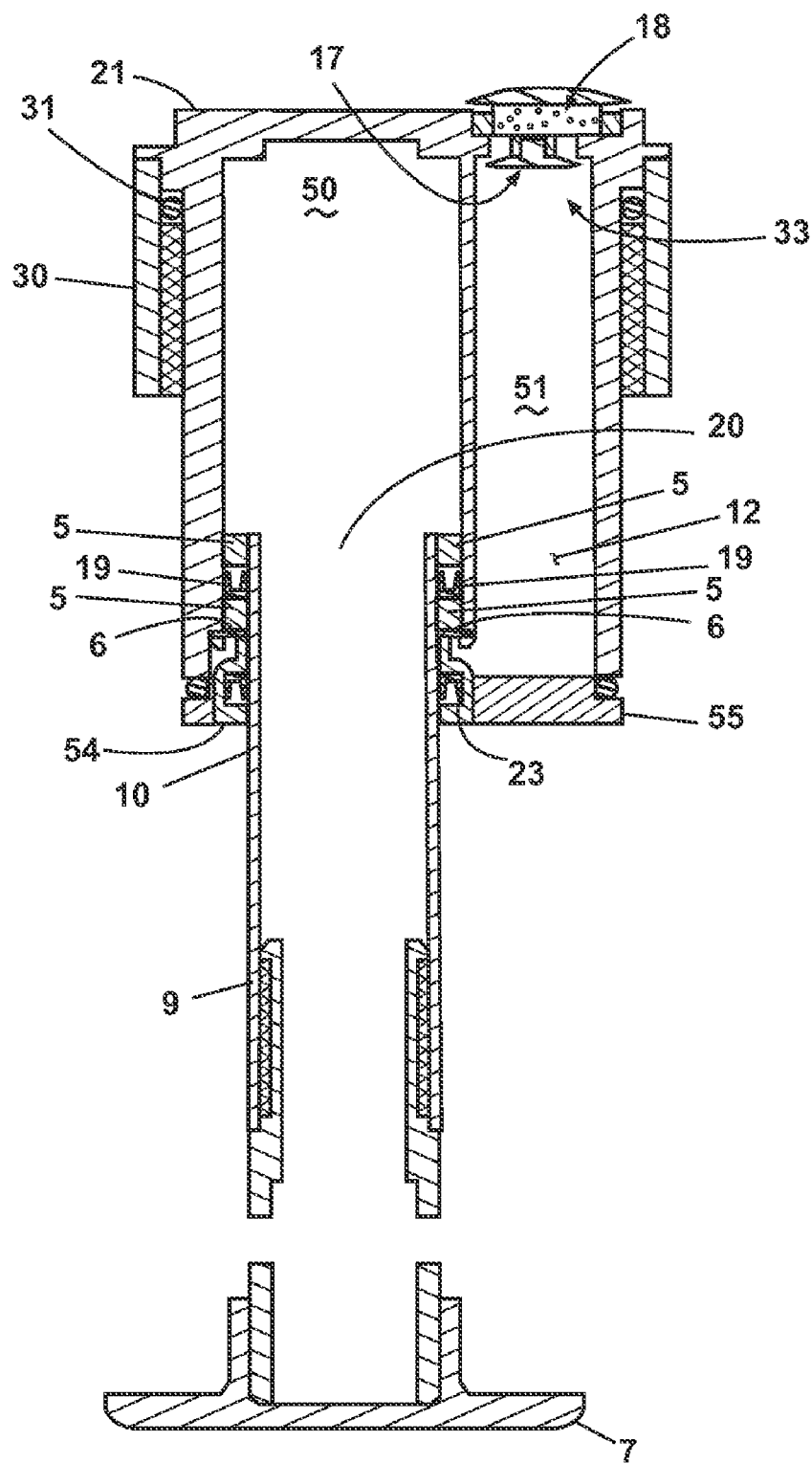
FIG. 4A is a cross-sectional view of the pump of FIG. 1 through the fresh air intake, illustrating a full compression position.

Referring to FIGS. 4 and 4A, a cross-section of the pump 25, taken through a fresh air intake 32, is illustrated by lines 4-4 on FIG. 1. The pump 25 is shown in FIG. 4 in the mid-stroke position and in FIG. 4A in the fully extended compression position. The pump 25 includes the pump housing 21, which encloses multiple integral chambers: a main chamber 50, a relief chamber 48 and an intake chamber 51. The main chamber 50 encloses a piston 5 that is slidingly received within the chamber 50. The interior surface of the piston 5 is attached to a rod 10, which extends out the open end of the housing 21. A piston seal 19, illustrated as an annular cup seal, is located around the piston 5 and seals the interface between the piston 5, rod 10, and main chamber 50 of the pump housing 21. The interface between the piston 5 and main chamber 50 is toleranced to provide a slight gap, through which air can be forced. The piston seal 19 seals off the gap between the piston 5 and main chamber 50. However, under the appropriate pressure, the piston seal 19 can deflect and allow the air to pass through the gap and thereby function as a one-way valve.

The rod 10 is attached to a collapsible buckling member 9, which extends linearly from the rod 10 and serves as an extension of the rod 10. Seated at the opposite end of the buckling member 9 is a disc shaped foot 7. A collar 54 and rod seal 23 encircle the rod 10 to seal the rod 10 to the open end of the main chamber 50.

Another seal, in the form of an annular base valve 6, is located at the interface between the rod 10, the open end of the main chamber 50, and the top of the collar 54. The space bounded by the main chamber 50, piston 5, rod 10, and base valve 6 defines a compression chamber 11. Under the appropriate pressure, the base valve 6 will deflect to perform the valve function. When not deflected the base valve 6 performs a seal function.

The intake chamber 51 is enclosed within the pump housing 21 and includes an intake valve 17 and an intake filter 18, exposed to the ambient air and located at the top of the intake chamber 51. The space bounded by the intake chamber 51, intake valve 17, collar 54 and base valve 6 defines an area that encloses a buffer volume 12 of air. The bottom of the intake chamber 51 is open to the collar 54 and base valve 6, fluidly connecting the buffer volume 12 and the compression chamber 11. One example of the type of valve that may be used for the intake valve 17 is a poppet valve.

Figure 3A:
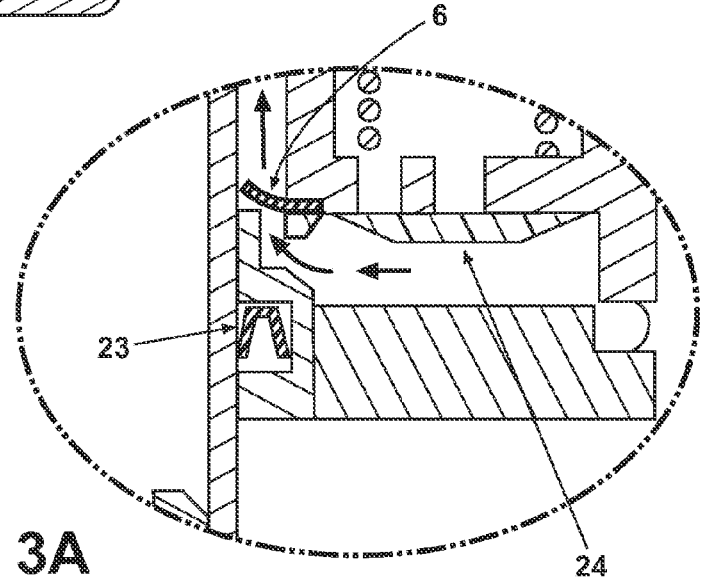
FIG. 3A is a detail view of the pump cross-section illustrated in FIG. 3.
Figure 3B:
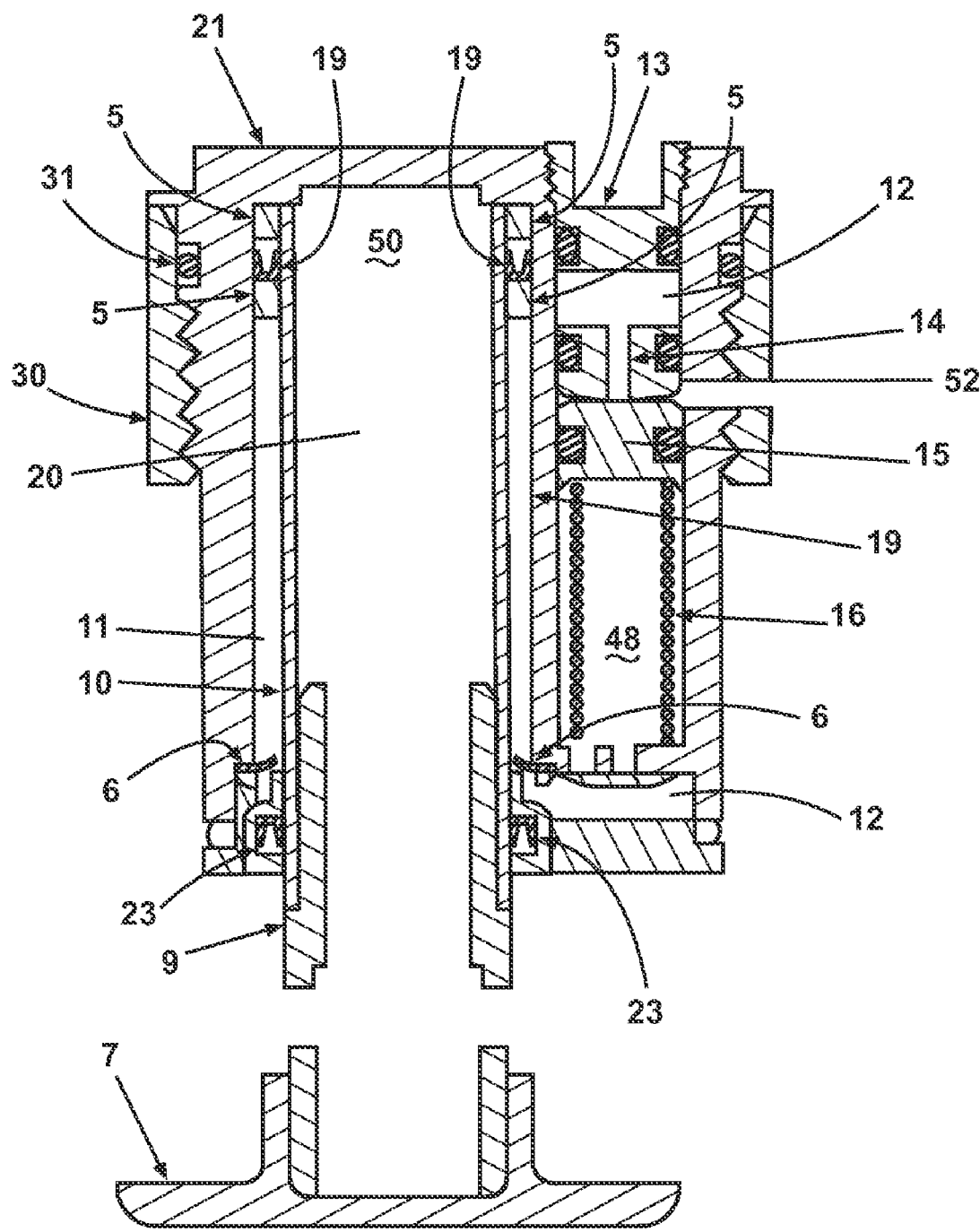
FIG. 3B is a cross-sectional view of the pump of FIG. 1 through the relief valve assembly, illustrating the full intake position.

Referring to FIGS. 3, 3A-B, a cross-section and detail view of the pump 25 taken through the relief valve assembly 33 is illustrated. The pump 25 is shown in FIG. 3 in the mid-stroke position and in FIG. 3B in the full intake position. The relief valve assembly 33 comprises a relief piston 15, a relief spring 16, and an adjusting piston 13 with a relief orifice 14, and is exposed to the pressurized air of the tire 26 via a hole 52 through the adapter 30 and pump housing 21. The adjusting piston 13 is mounted into the top of the pump housing 21, above the relief piston 15. The adjusting piston 13 and relief piston 15 are sealed against the relief chamber 48 by o-rings. Located in the bottom of the relief chamber 48 is one or more through holes that are closed off by a check valve 24, which fluidly connects the air in the relief valve to the buffer volume 12.

The pump housing 21 is closed off by an end cap 55. The end cap 55 encircles the collar 54, through which the rod 10 passes, and sealingly closes off the open end of the pump housing 21.

Pump operation can be explained by observing the pump in three zones relative to the contact patch 4 of the tire, as shown in FIG. 2. In Zone 1 of FIG. 2, the pump 25 is at a position on the wheel 29 before the contact patch 4. In Zone 1, the pump 25 has finished its cycle and is at rest with the piston 5 contacting the base valve 6. As the tire 26 continues to rotate, the pump 25 enters Zone 2, the foot 7 contacts the inside surface 8 of the tire 26 opposite of the contact patch 4 and strokes the piston 5, via the buckling member 9 and rod 10, away from the base valve 6. This stroke continues throughout Zone 2 of FIG. 2. This is the intake stroke. As the piston 5 is moving away from the base valve 6, air is drawn into the air compression chamber 11 from the buffer volume 12 through the base valve 6 (see the air flow arrows in FIG. 3A).

The buffer volume 12 is replenished with air from one of two sources depending on the air pressure (PSIG) in the tire. If the air pressure in the tire 26 is above the set pressure of the relief valve assembly (made up of the adjusting piston 13 with a relief orifice 14, the relief piston 15 and the relief spring 16) then the air pressure inside of the tire 26 acts on the relief piston 15 to compress the relief spring 16 and allow flow through the relief orifice 14, supplying air to the buffer volume 12 (see the air flow arrows in FIG. 3). When the relief orifice 14 is open, the pump 25 is recirculating air inside of the tire 26 so there is no increase in tire pressure due to outside air being pumped into the tire 26. The backside of the relief piston 15 can be vented to the atmosphere or, as shown in the preferred embodiment, vented to the buffer volume 12 with a check valve 24. With the later arrangement, the pressure on the backside of the relief piston 15 will be drawn down to slightly below atmospheric pressure. The set pressure of the relief valve assembly can be adjusted by turning the adjusting piston 13 in or out.

If the air pressure in the tire 26 is below the set pressure of the relief valve assembly, air is drawn into the buffer volume 12 past the fresh air intake valve 17 and through the intake filter 18 (see the air flow arrows in FIG. 4).

When the pressure in the tire 26 is greater than the set pressure, the open relief orifice 14 fills the buffer volume 12 with compressed air. During the intake stroke, the pressure of the air flowing into the compression chamber 11 is nearly equal to that of the tire pressure on the backside of the piston 5. The force required to perform the intake stroke with the open relief orifice 14 is a fraction of the force required when the (much lower pressure) air is drawn through the intake valve 17 due to a closed relief orifice 14. The small force requirement during the intake stroke greatly reduces the contact pressure between the foot 7 and the inside surface 8 of the tire 26. This reduces pump 25 component wear and tire 26 wear under the foot 7, both on the inside surface 8 and the contact patch 4 of the tire 26.

Further tire rotation brings the pump to Zone 3, where the piston 5 is stroked back to contact with the base valve 6. This is the compression stroke. During the compression stroke, the air which is compressed in the compression chamber 11 is relieved passed the piston seal 19, which acts as a one-way valve to the backside of the piston 5. The backside of the piston 5 connects to the tire 26 volume by way of the hole 20 in the rod 10 and additional passage(s) in the buckling member 9 to the tire 26 volume (see the air flow arrows in FIG. 4).

Figure 5:
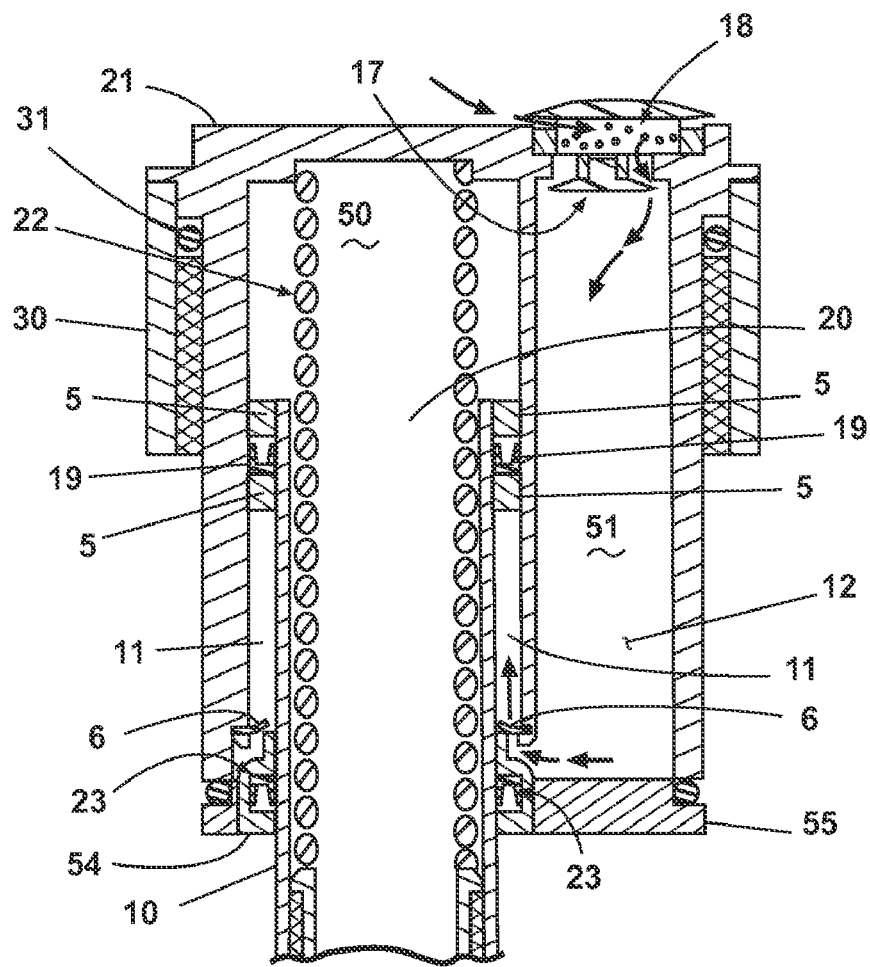
FIG. 5 is a cross-sectional view of the pump of FIG. 1 equipped with low speed helper spring.

While the air pressure inside the tire 26 is the primary force for the compression stroke, the total force acting to compress the air comes from multiple sources. First, the area under the piston 5 in the compression chamber 11 is equal to the effective area on the backside of the piston 5. Therefore, at the point where the air pressure in the compression chamber 11 equals the tire 26 air pressure, the piston 5 would stop if not for an additional force provided to overcome frictional losses and inefficiencies of the system. One source of additional force comes from the momentum of the piston 5 assembly that is gained during the acceleration of the piston 5 assembly in the first part of the compression stroke when the pressure on the backside of the piston 5 is larger than the pressure on the compression chamber 11 side. Another source of additional force comes from the centrifugal force produced by the mass of the piston 5 assembly as the pump housing 21 follows the radius of the curve of the wheel. As shown in FIG. 5, in the case of low speed vehicles with low RPM wheels, where inertial forces are negligible, a mechanical spring 22 can be added to the assembly to obtain the required additional force.

Using the air pressure on the backside of the piston 5 as the primary source of force for the air compression has several advantages. First, the force is independent of the mass of the moving assembly (which includes the piston 5, rod 10, buckling member 9, and foot 7). This means that the moving assembly can be made very lightweight, unlike centrifugal force based systems which require more mass for more force output. More mass increases wheel weight and wheel balance issues.

Figure 6:
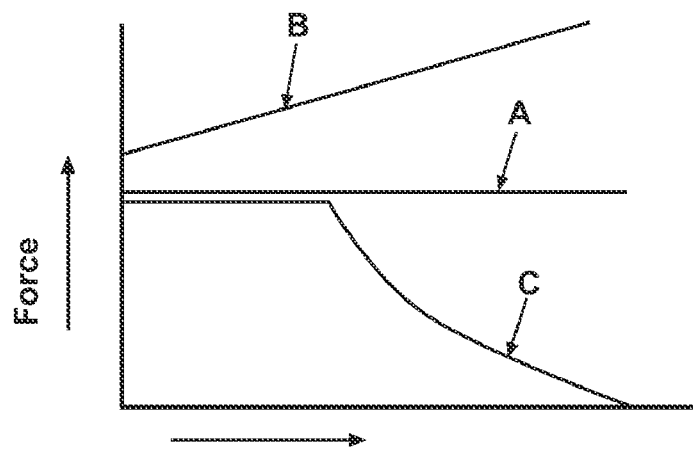
FIG. 6 is a graph of a mechanical spring/gas spring/required spring for air compression.

Another advantage of using air pressure as the primary source of force is that the force curve is flat for the entire intake and compression stroke. The volume in the tire 26 is thousands of times larger than the volume displaced by the compression piston 5 during intake. This enormous ratio of displaced volume to tire 26 volume creates an essentially flat force curve throughout the compression piston's 5 stroke as shown on Data Line A of FIG. 6.

Using the air pressure in the tire 26 as the return force for the compression piston 5 also has the advantage of always applying an equal and opposite force to compress the air in the compression chamber 11 to a pressure equal to that of the pressure in the tire 26 no matter what the current pressure in the tire 26 happens to be. Prior art, which uses mechanical springs to store the energy for the compression stroke, has the draw back that the spring must be sized for the highest pressure at which the tire 26 will operate. Therefore in commercial applications, if a manufacturer wanted to develop a single pump model for a pressure range, the pump model would need to have a spring large enough to compress the highest pressure in the range. The larger than necessary spring would cause increased component size, impact force, noise and cost. The mechanical spring has a limited life, especially if used efficiently at high material stress levels. Finally, the mechanical spring increases force output as deflection increases similar to Data Line B of FIG. 6. This means that the force required to compress the spring increases linearly with deflection. This is opposite of what is required for an air compressing piston. In reality an air piston pump requires force similar to Data Line C of FIG. 6 where the highest force is required at the minimum stroke (when the piston 5 is closest to the base valve 6).

The pump 25 has the advantage of being a variable displacement pump. Because the piston 5 stroke length is determined by the amount of tire 26 deflection, a tire 26 with low air pressure will have more deflection than a tire 26 at its desired pressure for the same tire 26 load. This is advantageous because a tire 26 with low pressure will deflect more stroking the compression piston 5 further and increasing the tire 26 pressure at a faster rate.

The base valve 6 serves three functions. It acts as a seal between the cylinder and intake housing. It is an intake valve. It acts as a bumper to reduce the impact of the piston 5 contacting the base valve 6 after the compression stroke.

The preferred embodiment shows a buffer air volume 12 which has four significant functions. The first function is to act as a port to connect the fresh intake valve 17 and relief orifice 14 with the base valve 6. Second, the volume 12 acts as a buffer. The intake stroke happens very fast at high wheel RPM, which means a relatively high volume of air has to move quickly. The intake and relief valves can be smaller since they have addition time outside of the intake stroke time interval to recharge the buffer volume 12. Third, the buffer volume 12 protects the tire 26 from losing air in the case of a leaking or malfunctioning relief valve assembly, or base valve 6 and piston seal 19 or rod seal 23. If one of these combinations has an air leak, the air escapes to the buffer volume 12 where it is stopped from escaping into the atmosphere by the fresh intake valve 17. This increases the robustness of the pump. Fourth, the buffer volume 12 allows the pump 25 to recycle air. This increases filter 18 life because air is only drawn through the filter when it is required to replenish the tire 26 air volume.

By using an intake filter made of a waterproof/breathable material such as commercially known Gortex, the filter can serve a dual function of keeping out liquid water which greatly reduces the amount of moisture drawn into the tire 26 and allows the wheel 29 and pump 25 to be submerged, while at the same time filtering out contaminates in the air. The intake filter 18 can also be wrapped around the head of the pump 25 in order to achieve the most exposure to the atmosphere and the least potential for being clogged by debris, especially a constant source of debris from one direction.

Referring to FIG. 7, the buckling member 9 transmits the force from the deflecting tire 26 to the compression piston 5. Although shown as a hollow tube made of rubber or polyurethane, the buckling member 9 could be any cross sectional shape or have a varying cross section and be constructed of other materials such as spring steel. The buckling member 9 is designed such that it can withstand the forces that are required to inflate the tire 26 to a predetermined pressure. In the case of forces which are higher than that required to inflate the tire 26, the buckling member 9 is designed to buckle and collapse. This feature protects the pump and tire 26 during conditions when the tire 26 deflection exceeds the piston 5 stroke length, such as driving on a very low or flat tire, when the tire hits an obstacle such as a curb, when the vehicle is overloaded or an outside tire during a hard cornering maneuver. Unlike prior art (such as U.S. Pat. No. 5,975,174) which uses a spring with a given spring rate, this invention uses a buckling member 9 which has a high stiffness until the point of buckling.

A means to render the pump 25 inactive at higher vehicle speeds may be added to the pump 25. Typically, vehicles that cruise at highway speeds run more miles per year and therefore don't need pumps 25 that are constantly cycling. When the pump 25 is inactive it will not wear pump 25 components or the tire 26, extending the life of both.

The pump 25 can be made inactive through a ratcheting lock out mechanism, as shown in FIG. 8, where a counterweight 35 is pulled toward the piston 5 when the inertial force is high enough to overcome the force of a compression spring 36. This motion engages a tooth 37 of a pivoting arm carrying the counterweight 35 with teeth 38 on the rod 10 thereby locking the rod 10 in its maximum intake stroke position.

Referring to FIG. 9, a speed triggered lock out with a friction mechanism can alternatively be provided in place of the ratchet mechanism of FIG. 8. The lockout device of FIG. 9 comprises a ball 39 that responds to an inertial force to overcome the force of a compression spring 40 such that the ball 39 rides down an inclined plane on a linkage 41. The ball 39 and linkage 41 then push against the walls of the rod 10, as shown by the ball 39 in phantom lines, locking the rod 10 in the maximum intake stroke position. Locking the rod 10 in this position keeps the foot 7 from contacting the inside surface 8 of the tire 26.

Referring to FIGS. 10-16, a second embodiment of the pump 25 according to the present invention is illustrated, where similar elements from the first embodiment are labeled with the same reference numerals increased by 100.

Figure 10:
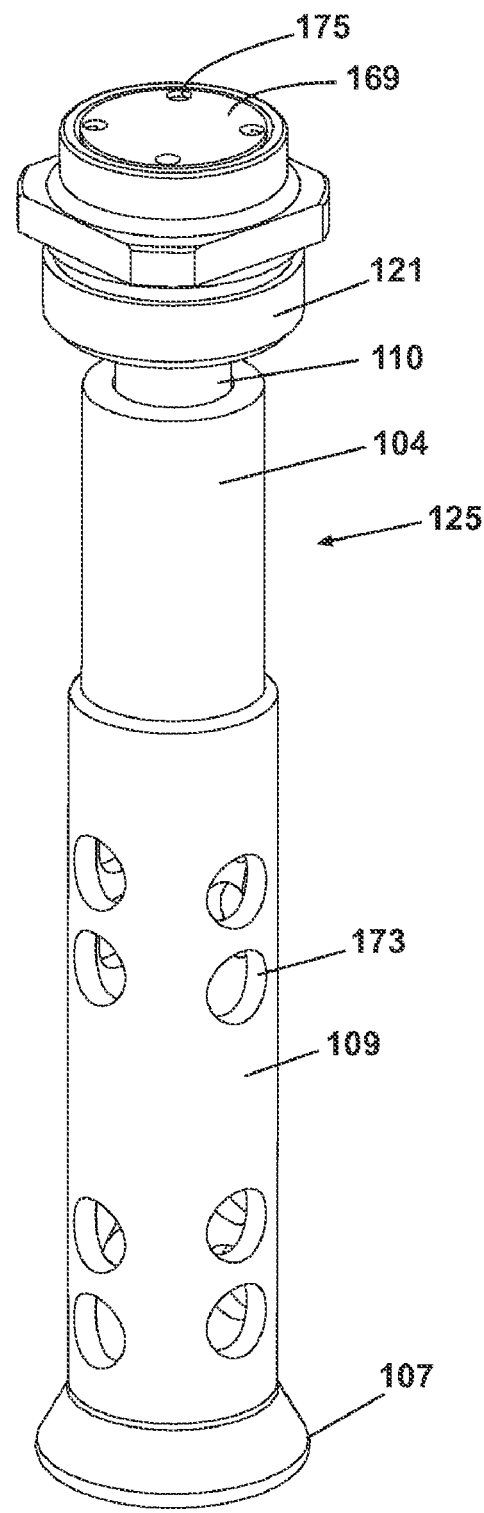
FIG. 10 is a perspective view of the pump according to a second embodiment of the invention.

As shown in FIG. 10, the pump 125 generally comprises co-axial components: a pump housing 121, a rod 110, a cylinder 104 and a buckling member 109. The cylinder 104 encloses a piston 105 that is slidingly received within the cylinder 104.

Figure 11:
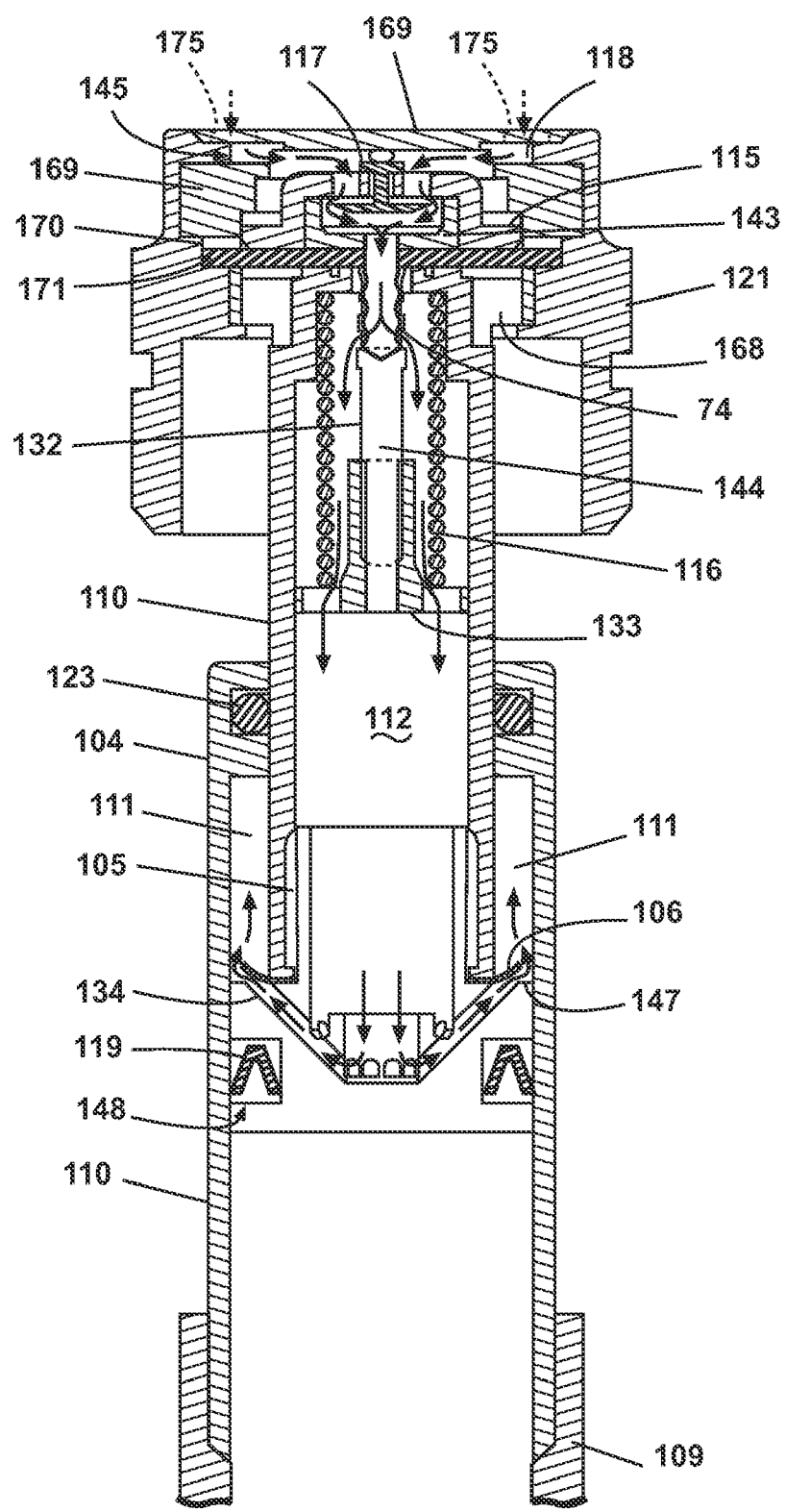
FIG. 11 is a longitudinal cross-sectional view of the pump of FIG. 10, showing the top half of the pump and illustrating the air flow path during the intake stroke.

Referring to FIG. 11, the top of the piston 105 is attached inside the lower end of the hollow rod 110; one exemplary means of attachment is a threaded screw fitting. The piston 105 is hollow through its center and includes a plurality of channels 134 that fluidly connect the hollow interior of the piston 105 to an exterior shoulder 147 of the piston 105. A piston seal 119 is located in a recess 148 around the piston 105 and seals the interface between the piston 105 and the cylinder 104.

The top of the cylinder 104 contains an opening through which a top end of the rod 168 extends. A rod seal 123, for example an o-ring, is located inside the top of the cylinder 104 and encircles the circumference of the rod 110, sealing the rod 110 against the cylinder 104. Another seal, a base valve 106, lies atop the shoulder 147 of the piston 105 and seals the rod 110 against the piston 105.

The space bounded by the cylinder 104, the rod 110, and the base valve 106 defines a compression chamber 111. Also, the volume of air contained within the hollow rod 110 defines a buffer volume 112 of air.

The open lower end of the cylinder 104 is attached to a collapsible buckling member 109, which extends linearly from the cylinder 104 and serves as an extension of the cylinder 104. Integral to the opposite end of the buckling member 109 is a foot 107.

The pump housing 121 is attached to top end of the rod 168. The top end of the rod 168 is closed and contains a center hole through which a relief spring pin 132 is inserted. A shaft 144 of the relief spring pin 132 extends down into the rod 110, while a hollow head 143 of the relief spring pin 132 is seated outside the closed top end of the rod 168. The top half of the relief spring pin 132 shaft 144 is also hollow and includes a plurality of through holes 174. The lower half of the shaft 144 is solid. A relief spring 116 is enclosed in the hollow rod 110 and encircles the relief spring pin 132. The lower end of the relief spring 116 is retained by a spring retainer 133, which attaches to the shaft 144 of the relief spring pin 132. The spring retainer 133 can be threaded to the relief spring pin 132 to allow adjustment of the relief spring 116 length to adjust the relief pressure setting.

The top of the pump housing 121 is closed off by a diaphragm retainer 169. Located between the diaphragm retainer 169 and the top end of the rod 168 are a relief piston 115, a diaphragm washer 170, and a relief diaphragm 171. The relief piston 115 is press fit around the head 143 of the relief spring pin 132. The relief piston 115 has a plurality of through holes in the upper portion through which air can pass. Attached through a hole in the relief piston 115, and located between the relief piston 115 and the head 143 of the relief spring pin 132, is a fresh air intake valve 117. One example of the type of valve that may be used for the intake valve 117 is a poppet valve.

The relief diaphragm 171 is located between the top end of the rod 168 and the relief piston 115 and head 144 of the relief spring pin 132 and seals the components together. The diaphragm washer 170 is located above the outer perimeter of the relief diaphragm 171 and the two components are sandwiched between a shoulder in the pump housing 121 and the diaphragm retainer 169.

The diaphragm retainer 169 comprises an annular recess 145 and a plurality of through holes 175 through the top surface. A filter 118 encircles the diaphragm retainer 169 and is located within the annular recess 145. A plurality of horizontal channels 146 run from the recess 145 through to the open center of the diaphragm retainer 169. The through holes 175, filter 118, and channels 146 provide fluid communication between the exterior (atmospheric air) and the interior of the diaphragm retainer 169.

Similar to the pump 25 of the first embodiment, the pump 125 can be affixed to a wheel 29 (FIG. 2) by way of threading the pump housing 121 into an adapter (not shown), which is brazed to the wheel 29, or the adapter can be an integral part of the wheel 29. An O-ring seals the threaded connection. Affixing the pump 125 is not limited to the method described above, as any suitable method of attachment will suffice.

Figure 12:
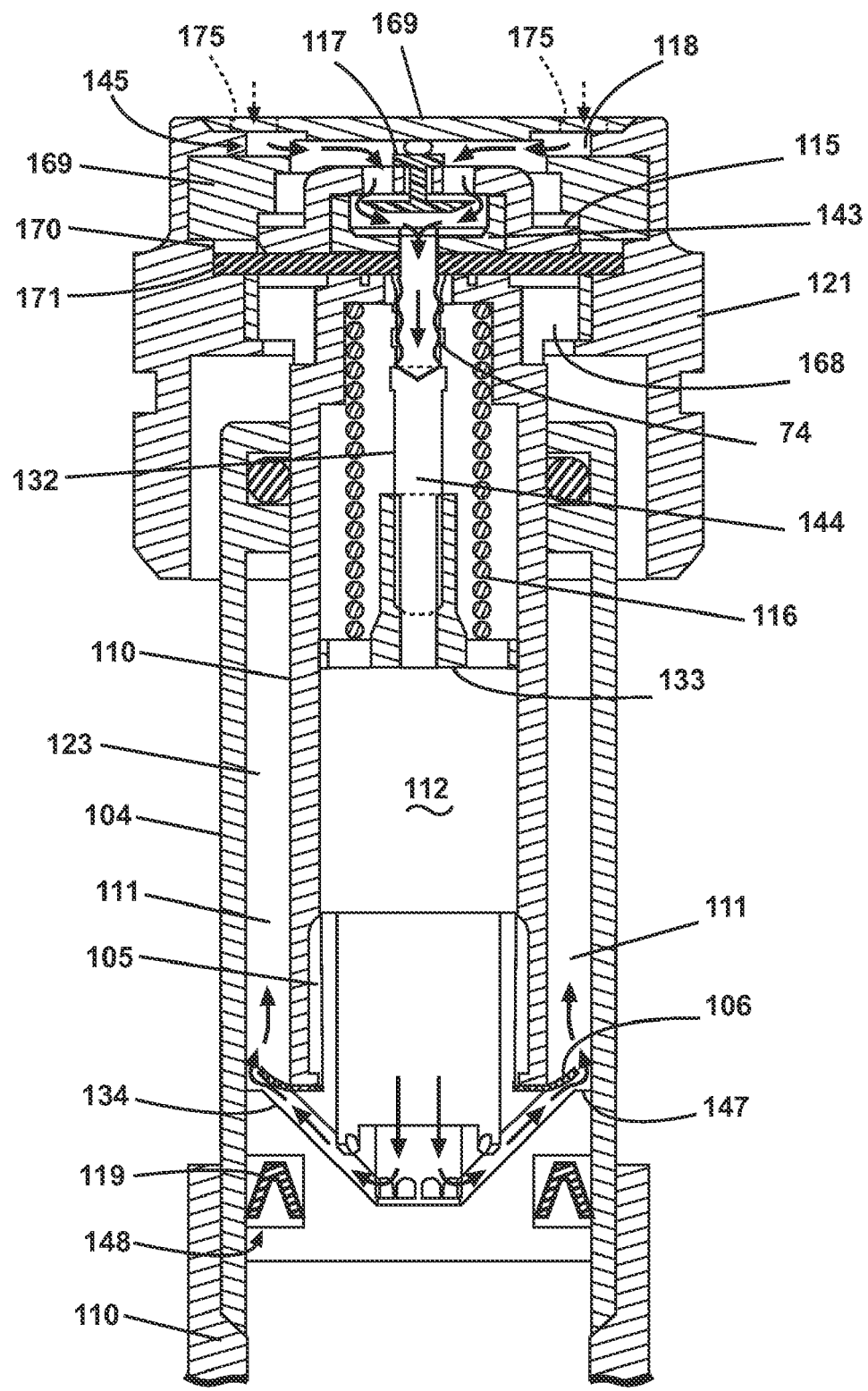
FIG. 12 is a longitudinal cross-sectional view of the pump of FIG. 10, illustrating the full intake position.

Referring to FIG. 12, the intake stroke that occurs throughout Zone 2 (FIG. 2) is shown and the air flow path during intake of the pump 125 is illustrated. In operation, as the tire 26 (FIG. 2) rotates into Zone 2, the foot 107 contacts the inside surface of the tire 26, opposite the contact patch 4 (FIG. 2) and strokes the cylinder 104, via the buckling member 109, upward toward the pump housing 121. As the closed end of the cylinder 104 moves away from the piston 105, the area in the compression chamber 111 increases, creating a low-pressure area. This draws air into the compression chamber 111 from the buffer volume 112 and through the intake valve 117. During intake, atmospheric air is drawn through the holes 175 in the top of the diaphragm retainer 169, the filter 118, the channels 146, and the holes in the top of the relief piston 115. The intake valve 117 is drawn downward, allowing air to pass through the holes in the top of the relief piston 115, through the hollow center of the relief spring pin 132, through the holes 174, and into the buffer volume 112.

During intake, the low pressure in the compression chamber 111 draws air in from the buffer volume 112. Air is pulled through the open center of the piston 105 and through the channels 134. The draw of the air pulls the free end of the base valve 106 away from its seated position, uncovering the ends of the channels 134 and allowing the air to be drawn into the compression chamber 111.

Figure 13:
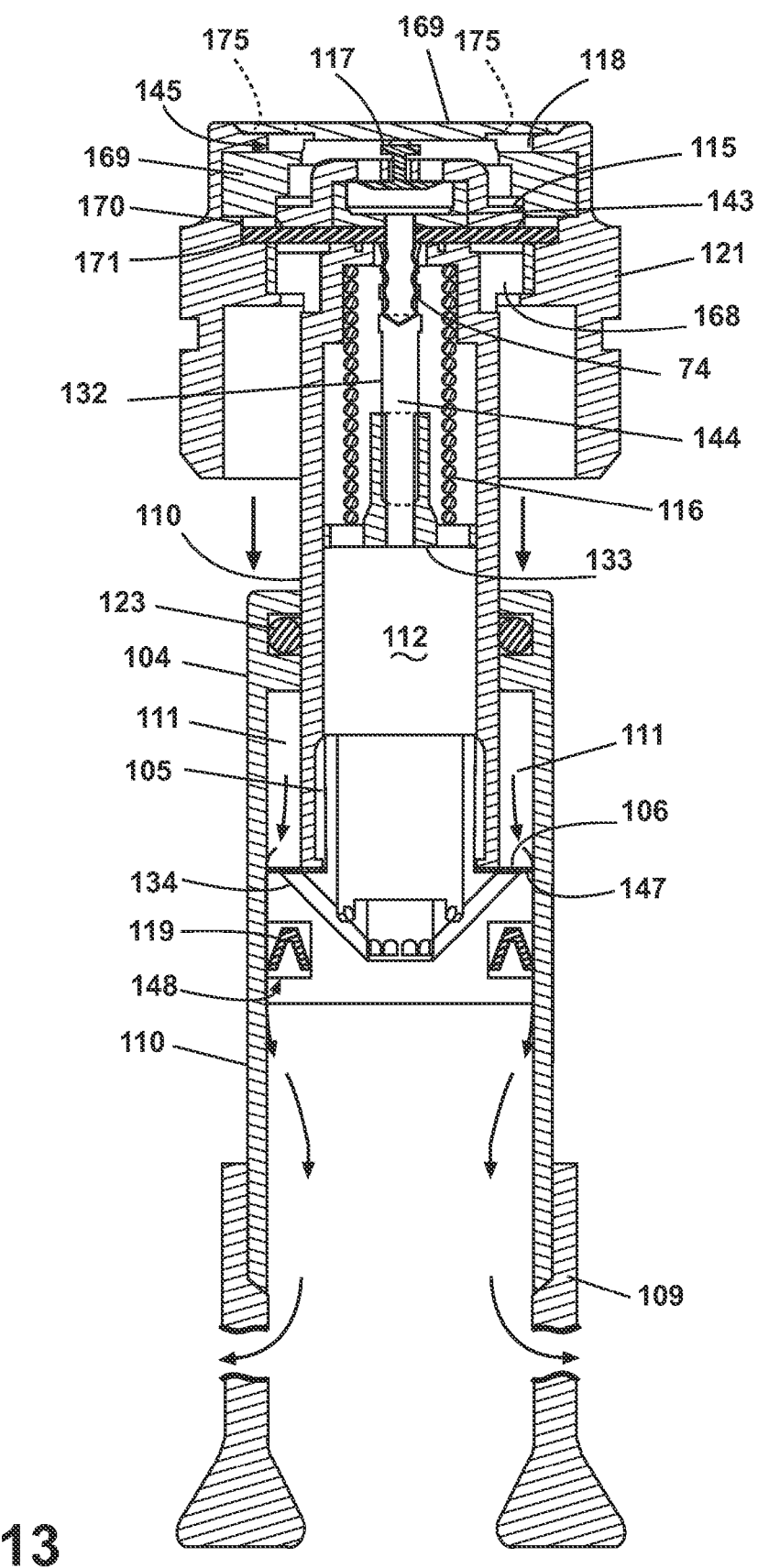
FIG. 13 is a longitudinal cross-sectional view of the pump of FIG. 10, illustrating the air flow path during the compression stroke.
Figure 13A:
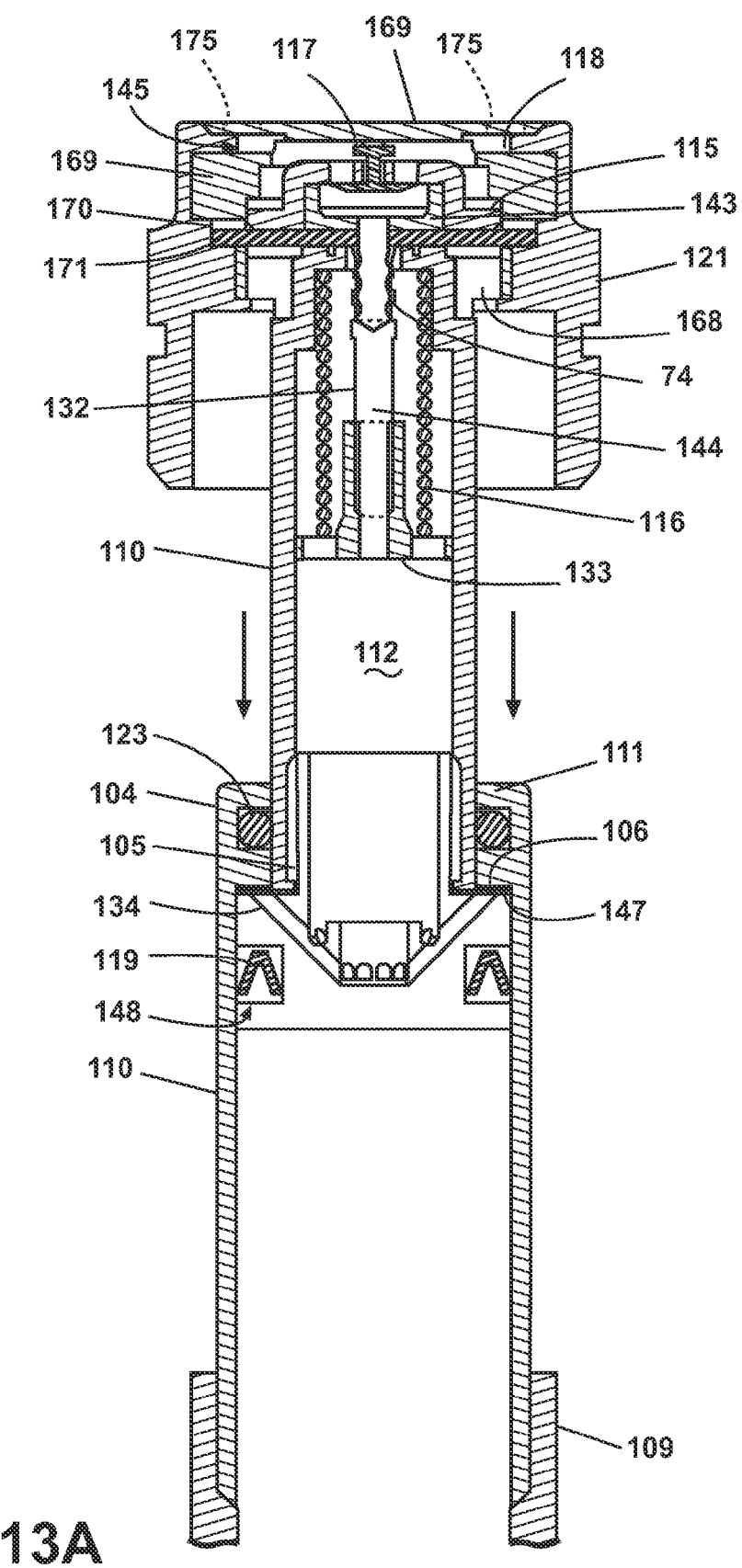
FIG. 13A is a longitudinal cross-sectional view of the pump of FIG. 10, illustrating the full compression position.

Referring to FIGS. 13 and 13A, the compression stroke that occurs throughout Zone 3 (FIG. 2) is shown and the air flow path during compression of the pump 125 is illustrated. When the pump 125 enters Zone 3, the foot 107 is no longer in contact with the contact patch 4 (FIG. 2) and is free to expand back to its fully extended position. The pressurized air within the tire 26 (FIG. 2) acts on the cylinder 104, urging the cylinder 104 to slide along the rod 110, back to its fully extended position. During the compression stroke, the area within the compression chamber 111 is decreased, creating a higher air pressure within the compression chamber 111. The compressed air in the compression chamber 111 is relieved passed the small gap that exists between the cylinder 104 and the base valve 106 and piston 105. The piston seal 119 is a one-way valve and also flexes away from the cylinder 104, allowing air to pass by it. The air rushes passed the small gap between the cylinder 104 and into the open cylinder 104, which is fluidly connected to the buckling member 109. From the buckling member 109, the pressurized air passes through a plurality of holes 173 (FIG. 10) and into the tire 26 volume. During the compression stroke, the intake valve 117 and base valve 106 are closed.

Similarly to the pump 25 of the first embodiment, the force that acts on the cylinder 104 to compress the air is due to a combination of the pressurized air within the tire 26, the momentum of the cylinder 104, and the centrifugal force due to the rotation of the tire 26, with the force of the pressurized air functioning as the primary force. The force from the pressurized air is sufficient to effect the compression stroke.

Figure 14:
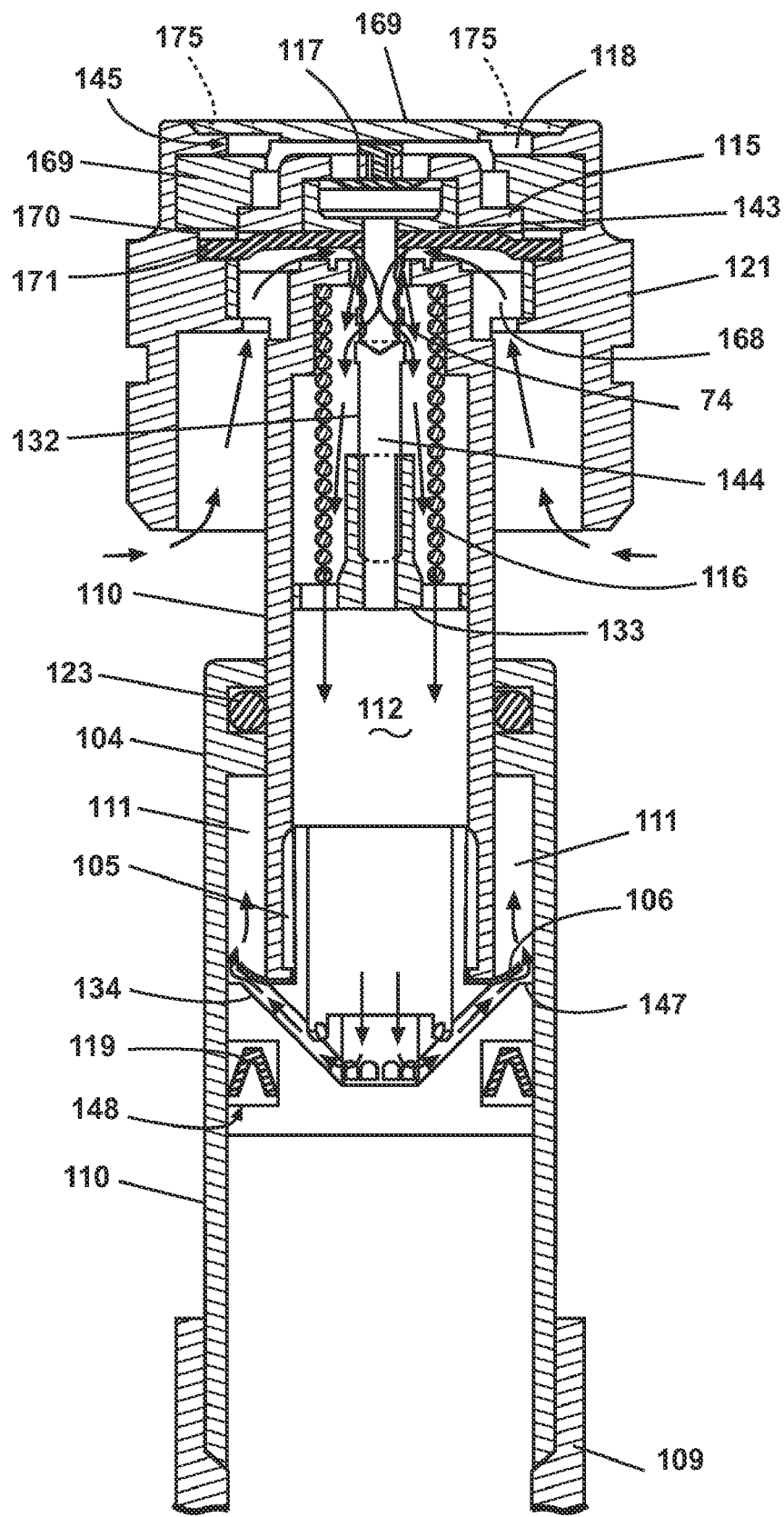
FIG. 14 is a cross-sectional view of the pump of FIG. 10, illustrating the air flow path when the relief pressure is met.

Referring to FIG. 14, the air flow path of the pump 125 when the relief pressure is met is illustrated. The relief valve assembly is comprised of the relief piston 115, relief spring 116, relief spring pin 132, spring retainer 133, relief diaphragm 171, and diaphragm washer 170. The set pressure of the relief valve assembly can be set by adjusting the spring retainer 133 position on relief spring pin 132, as described above.

When the air pressure in the tire 26 (FIG. 2) is above the set pressure of the relief valve assembly, the air pressure inside the tire 26 acts on the relief diaphragm 171. The pressurized air pushes against the relief diaphragm 171, which acts on the relief piston 115. As the relief diaphragm 171 flexes, the relief piston 115 and the attached head 143 of the relief spring pin 132 (and hence the relief spring pin 132) translate upward. This opens a path for the air to flow between the relief diaphragm 171 and the top end of the rod 168. The air then passes through the plurality of holes 174 in the relief spring pin 132 and into the buffer volume 112. The remaining air path into and out of the cylinder 104 follows that of the above described intake and compression strokes.

Figure 15:
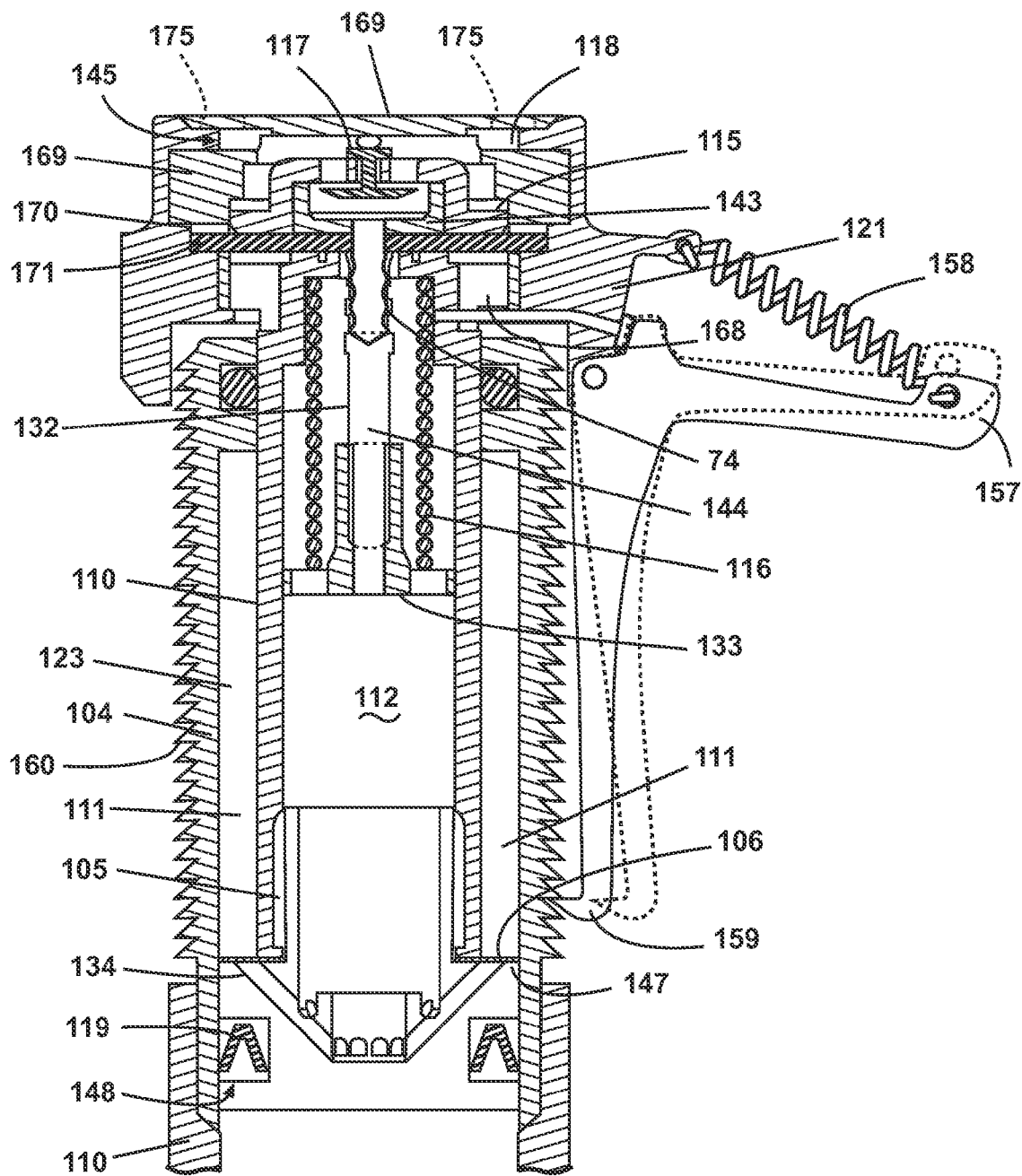
FIG. 15 illustrates an alternate embodiment of the pump of FIG. 10, with the addition of a ratchet type speed lock.

It may be desirable to inactive the pump 125 at higher vehicle speeds. FIG. 15 shows the pump 125, including a ratchet-type high speed lock. This is one example of a mechanism which will lock the pump 125 into an inactive position during high speeds. The ratcheting speed lock 156 comprises a counterweight 157, a return spring 158, and an integral tooth 159. The counterweight 157 is attached to the pump housing 121 by the return spring 158. The cylinder 104 includes teeth 160 located on the cylinder 104 circumference. At high speeds, due to centrifugal force, the counter weight 157 is balanced to overcome the spring force provided by the return spring 158. This pivots the counterweight 157 to engage the tooth 159 with the cylinder teeth 160. When the speed is lowered, the counterweight 157 pivots back to its original position, which disengages the tooth 159 and cylinder teeth 160, and unlocks the pump 125.

Figure 16:
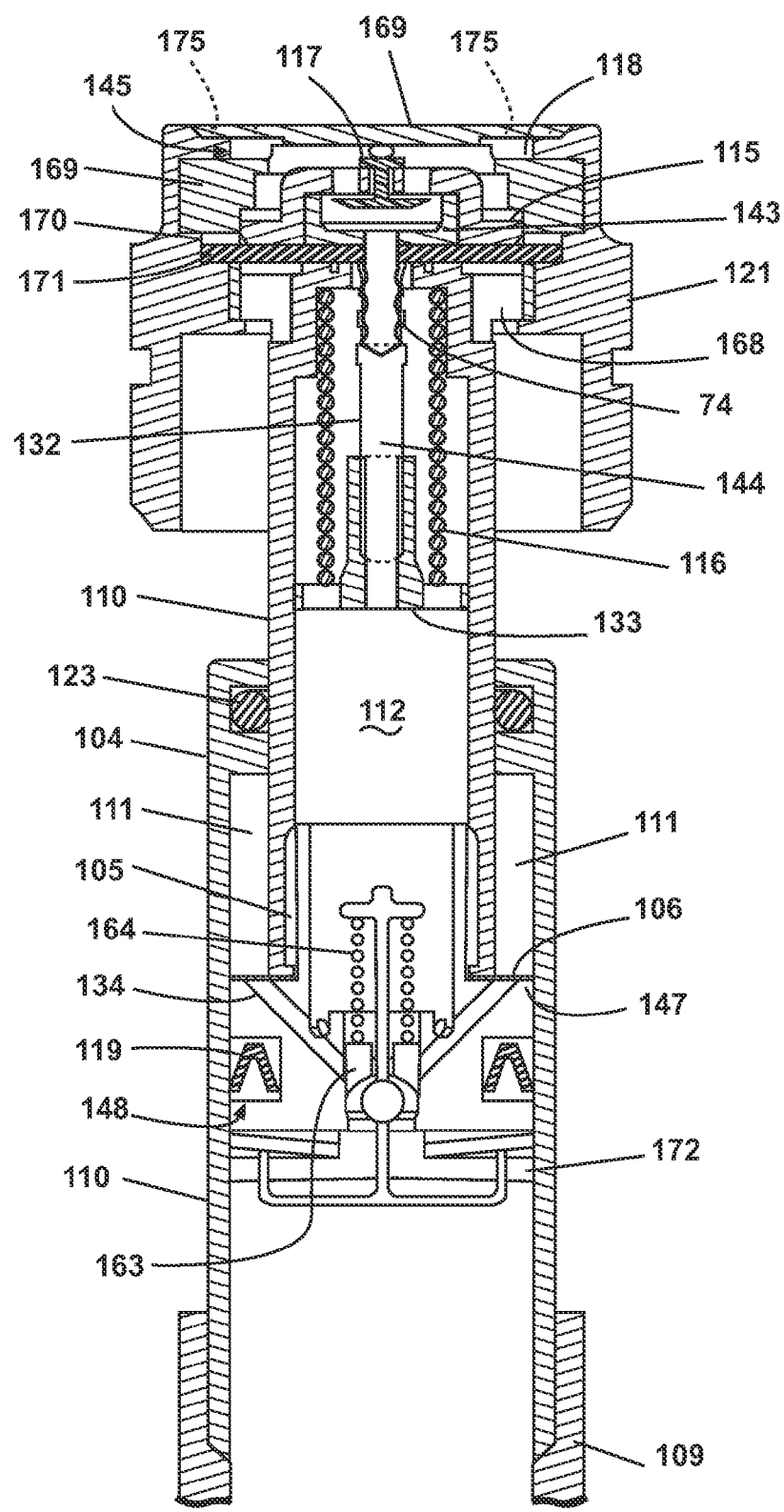
FIG. 16 illustrates an alternate embodiment of the pump of FIG. 10, with the addition of a friction type speed lock.

Referring to FIG. 16, the pump 125 including a friction-type speed lock is shown. This is another example of a mechanism which will lock the pump 125 into an inactive position during high speeds. The friction speed lock 162 comprises a check valve 163 and a spring 164. The check valve 163 is inserted through a center hole in the anchor lock 172 and up through the center of the piston 105. The spring 164 is compressed between the head of the check valve 163 and the piston 105. The side walls of the check valve 163 press up against the angled plates of the anchor lock 172, holding them away from the interior wall of the cylinder 104. At high speeds, due to centrifugal force, the check valve 163 overcomes the spring force provided by the spring 164 and moves away from the piston 105. This releases the angled plates of the anchor lock 172, allowing them to move down and come into contact with the cylinder 104 wall, creating a frictional lock up. When the speed is lowered, the check valve 163 moves back up to its original position, which disengages the angled walls of the anchor lock 172 from the cylinder 104 wall.

Variations or additions to the previously described embodiments may be made or used. The following are examples.

Loose balls can be housed in the filter 18 compartment to break up built up or caked on mud, sludge or other debris in the intake area. This keeps the filter maintenance free. The rotating motion of the tire will tumble the balls against the filter debris at low wheel RPM.

The relief assembly can simply be replaced by a ball, seat, and spring arrangement in order to reduce part count and simplify the design.

Figure 17:
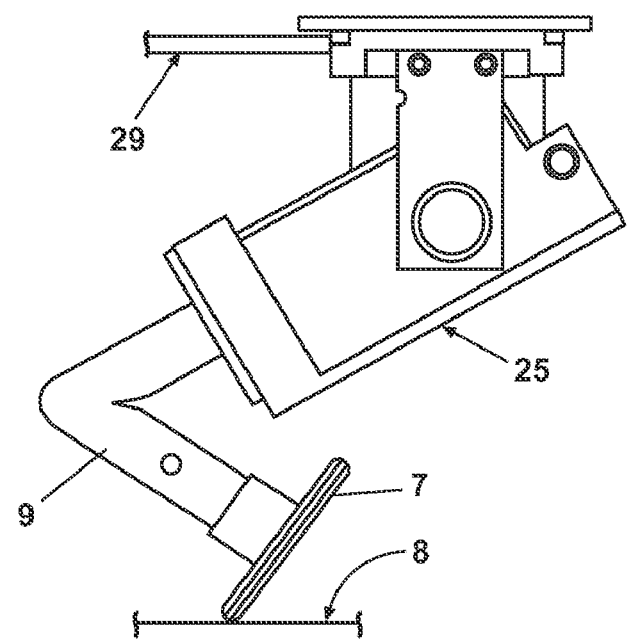
FIG. 17 shows an alternate embodiment of a pump, illustrating a low profile pump with pivot inside of tire.

An optional form of protection for severe tire deflections is shown in FIG. 17. The pump 25 is pivotally mounted at the wheel end and hinges at a predetermined axial force near the middle of the pump 25. This allows the pump 25 to be entirely encapsulated in the tire.

Figure 18:
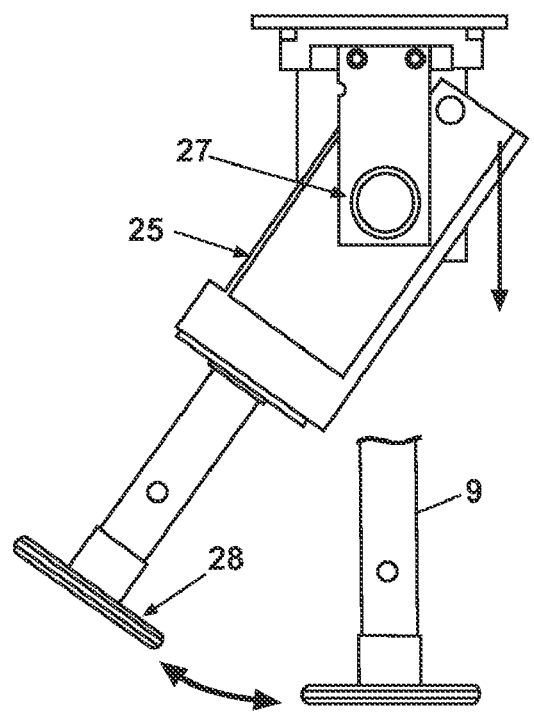
FIG. 18 shows an alternate embodiment of a pump, which can swing through an arc to reduce localized tire wear.

Another option for the pivotally mounted pump 25 is to have an offset center of gravity counteracted by a torsion spring 27. This causes the foot 28 in FIG. 18 to swing through an arc that varies with wheel RPM. This increases the contact area on the tire 26. This can reduce wear to the tread and inside of the tire at a localized spot.

Figure 19:
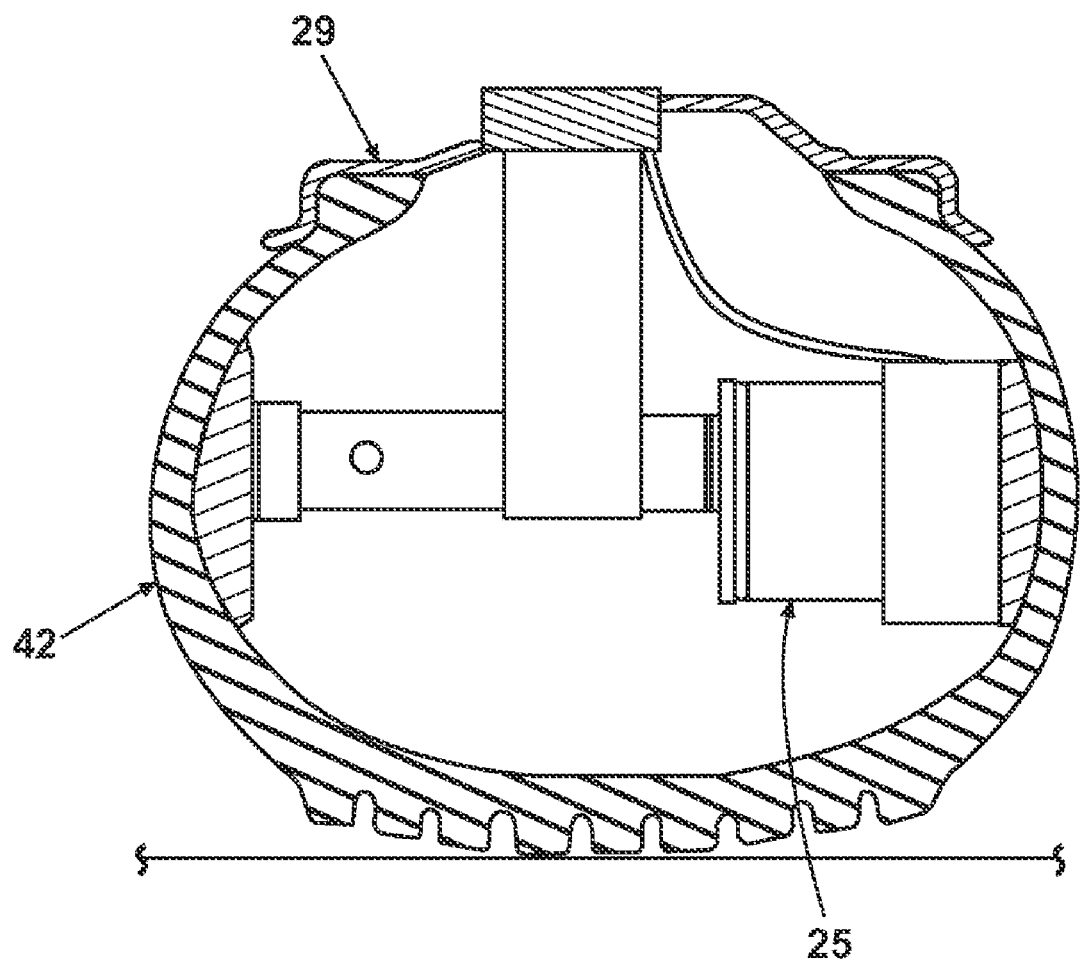
FIG. 19 shows and alternate embodiment of a pump, illustrating the use of sidewalls of tire for force input.

FIG. 19 is another embodiment of the invention with similar function to the preferred embodiment with the significant difference that it uses tire sidewall 42 deflection to stroke the pump 25.

While the embodiment is described as used on a tire and wheel combination, it can be used on any device which has motion and a pump is needed, including air spring mounts, an air suspension system or various gas or liquid pump applications.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A tire assembly comprising:
    a wheel configured to rotate about a rotational axis above a contact surface;
    a tire mounted to the wheel and configured to deflect when in contact with the contact surface, the tire at least partially defining a tire chamber configured to hold air pressurized relative to the ambient air; and
    an air pump carried by the wheel and comprising:
        first and second elements coupled together for relative reciprocation between an intake stroke, during which the first and second elements are reciprocally collapsed, and a compression stroke, during which the first and second elements are reciprocally extended;
        a variable volume chamber defined by the first and second elements and selectively fluidly coupled to the ambient air and to the tire chamber, and the variable volume chamber is configured to increase in volume during the intake stroke to draw ambient air into the variable voluble chamber and decrease in volume during the compression stroke to force the ambient air in the variable volume chamber into the tire chamber; and
        a portion of one of the first and second elements fluidly separating the variable volume chamber from the tire chamber such that one side of the portion is exposed to the air in the variable volume chamber and another side of the portion, opposite the one side, is exposed to the air in the tire chamber, and defines a pressure differential across the portion based on the air pressure in the tire chamber and the air pressure in the variable volume chamber;
    wherein as the wheel rotates, one of the first and second elements responds to the deflection of the tire to effect the intake stroke and draw ambient air into the variable volume chamber, and the continued rotation of the wheel frees the one of the first and second elements from the deflection of the tire and the pressure differential provides the force to reciprocate the first and second elements to effect the compression stroke and force the ambient air from the variable volume chamber into the tire chamber to pump up the tire.

2. The tire assembly according to claim 1 wherein the one of the first and second elements comprises a piston.

3. The tire assembly according to claim 2 wherein the piston is fixedly mounted to the wheel and further comprising a cylinder reciprocally mounted to the piston and a rod having a top forming the portion.

4. The tire assembly according to claim 3 wherein the cylinder comprises a collapsible member configured to collapse in response to a predetermined deflection of the tire.

5. The tire assembly according to claim 2 wherein the other of the first and second elements comprises a housing and the piston is slidably received within the housing to define the variable volume chamber between the piston and the housing.

6. The tire assembly according to claim 5 wherein the piston defines the portion and is in sealing engagement with the housing to partially define the variable volume chamber between the head and the housing.

7. The tire assembly according to claim 1 further comprising a relief valve fluidly coupling the variable volume chamber to the tire chamber and configured to open when the pressurized air in the tire reaches a predetermined pressure to prevent the further pumping of air into the tire when the pressurized air reaches the predetermined pressure.

8. The tire assembly according to claim 1 further comprising a check valve fluidly coupling the variable volume chamber to the tire chamber to permit air to flow from the variable volume chamber into the tire chamber while preventing air from flowing from the tire chamber into the variable volume chamber.

9. The tire assembly according to claim 1 further comprising a lock-out device operably coupled to the first and second elements to prevent their relative reciprocating movement.

10. The tire assembly according to claim 9 wherein the lock-out device is a centrifugal lock-out device responsive to centrifugal force generated by the rotating wheel and configured to prevent the relative reciprocation above a predetermined rate of rotation for the wheel.

11. The tire assembly according to claim 1 wherein at least one of the first and second elements comprises a collapsible member configured to collapse between a normal condition and a collapsed condition in response to predetermined deflection of the tire to prevent damage to the first and second elements.

12. The tire assembly according to claim 11 wherein the collapsible member is configured to buckle to effect the collapsing and the transition between the normal condition and the collapsed condition.

13. The tire assembly according to claim 11 wherein the collapsible member is resilient and returns to normal condition from the collapsed condition after the removal of the predetermined deflection of the tire.

14. The tire assembly according to claim 11 wherein the first element is fixedly mounted to the wheel and the second reciprocating element reciprocates relative to the first element.

15. The tire assembly according to claim 14 wherein the second element comprises the collapsible member.

16. The tire assembly according to claim 15 wherein second element is made from resilient material enabling the second element to operate between a normal and collapsed condition to form the collapsible member.

17. The tire assembly according to claim 16 wherein the second element is a housing and the first element is a piston.

18. A pump for a tire assembly comprising a wheel configured to rotate about a rotational axis above a contact surface and a tire mounted to the wheel and configured to deflect when in contact with the contact surface, the tire at least partially defining a tire chamber configured to hold air pressurized relative to the ambient air; the pump comprising:

first and second elements coupled together for relative reciprocation between an intake stroke, during which the first and second reciprocating elements are reciprocally collapsed, and a compression stroke, during which the first and second reciprocating elements are reciprocally extended;

a variable volume chamber defined by the first and second elements and selectively fluidly coupled to the ambient air and to the tire chamber, and the variable volume chamber is configured to increase in volume during the intake stroke to draw ambient air into the variable volume chamber and decrease in volume during the compression stroke to force the ambient air in the variable volume chamber into the tire chamber; and a portion of one of the first and second elements fluidly separating the variable volume chamber from the tire chamber such that one side of the portion is exposed to the air in the variable volume chamber and another side of the portion, opposite the one side, is exposed to the air in the tire chamber when the pump is mounted to the tire assembly, and defines a pressure differential across the portion based on the air pressure in the tire chamber and the air pressure in the variable volume chamber;

wherein as the wheel rotates, one of the first and second elements responds to the deflection of the tire to effect the intake stroke and draw ambient air into the variable volume chamber, and the continued rotation of the wheel frees the one of the first and second elements from the deflection of the tire and the pressure differential provides the force to reciprocate the first and second elements to effect the compression stroke and force the ambient air from the variable volume chamber into the tire chamber to pump up the tire.

19. The pump according to claim 18 wherein the first reciprocating element is configured to be fixedly mounted to the wheel and the air pressure biasing element is carried by the second reciprocating element.

20. The pump according to claim 18 wherein the second reciprocating element comprises a collapsible member configured to collapse in response to a predetermined deflection of the tire.

* * * * *

UNITED STATES PATENT AND TRADEMARK OFFICE
CERTIFICATE OF CORRECTION

PATENT NO. : 7,748,422 B2  Page 1 of 1
APPLICATION NO. : 12/123903
DATED : July 6, 2010
INVENTOR(S) : Stephen J. Bol It is certified that error appears in the above-identified patent and that said Letters Patent is hereby corrected as shown below:

In The Claims:
Claim 1, lines 42-50: "a variable volume chamber defined by the first and second elements and selectively fluidly coupled to the ambient air and to the tire chamber, and the variable volume chamber is configured to increase in volume during the intake stroke to draw ambient air into the variable voluble chamber and decrease in volume during the compression stroke to force the ambient air in the variable volume chamber into the tire chamber; and" should be -- a variable volume chamber defined by the first and second elements and selectively fluidly coupled to the ambient air and to the tire chamber, and the variable volume chamber is configured to increase in volume during the intake stroke to draw ambient air into the variable volume chamber and decrease in volume during the compression stroke to force the ambient air in the variable volume chamber into the tire chamber; and --

Signed and Sealed this

Thirty-first Day of August, 2010

David J. Kappos
*Director of the United States Patent and Trademark Office*

UNITED STATES PATENT AND TRADEMARK OFFICE
CERTIFICATE OF CORRECTION

PATENT NO. : 7,748,422 B2  
APPLICATION NO. : 12/123903  
DATED : July 6, 2010  
INVENTOR(S) : Stephen J. Bol Page 1 of 1

It is certified that error appears in the above-identified patent and that said Letters Patent is hereby corrected as shown below:

In The Claims:
Claim 1, Column 10, lines 42-50: "a variable volume chamber defined by the first and second elements and selectively fluidly coupled to the ambient air and to the tire chamber, and the variable volume chamber is configured to increase in volume during the intake stroke to draw ambient air into the variable voluble chamber and decrease in volume during the compression stroke to force the ambient air in the variable volume chamber into the tire chamber; and" should be -- a variable volume chamber defined by the first and second elements and selectively fluidly coupled to the ambient air and to the tire chamber, and the variable volume chamber is configured to increase in volume during the intake stroke to draw ambient air into the variable volume chamber and decrease in volume during the compression stroke to force the ambient air in the variable volume chamber into the tire chamber; and --

This certificate supersedes the Certificate of Correction issued August 31, 2010.

Signed and Sealed this

Twenty-eighth Day of September, 2010

David J. Kappos  
*Director of the United States Patent and Trademark Office*